(12) United States Patent
Kim et al.

(10) Patent No.: US 10,122,389 B2
(45) Date of Patent: Nov. 6, 2018

(54) COMMUNICATION CIRCUIT FOR SUPPORTING COMMUNICATION FUNCTION AND ELECTRONIC DEVICE INCLUDING THE SAME

(71) Applicant: Samsung Electronics Co., Ltd, Suwon-si (KR)

(72) Inventors: Young Ju Kim, Yongin-si (KR); Sung Chul Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/959,603

(22) Filed: Dec. 4, 2015

(65) Prior Publication Data
US 2016/0164547 A1 Jun. 9, 2016

(30) Foreign Application Priority Data
Dec. 5, 2014 (KR) .................. 10-2014-0174412

(51) Int. Cl.
H04B 1/44 (2006.01)
H04B 1/00 (2006.01)
H04B 1/403 (2015.01)

(52) U.S. Cl.
CPC ......... *H04B 1/0057* (2013.01); *H04B 1/0053* (2013.01); *H04B 1/403* (2013.01)

(58) Field of Classification Search
CPC .... H04B 1/0057; H04B 1/0053; H04B 1/403; H04B 1/40; H04B 1/54; H04B 1/44; H04B 1/406; H04B 1/3822; H04B 1/525; H04B 1/18; H04B 1/30; H04B 1/48; H04B 1/005; H04B 1/0067

USPC ......... 455/77, 78, 266, 550, 73, 168.1, 307, 455/550.1, 82
See application file for complete search history.

(56) References Cited

U.S. PATENT DOCUMENTS

| | | | | |
|---|---|---|---|---|
| 6,091,966 | A * | 7/2000 | Meadows | H03F 1/56 330/124 R |
| 2003/0193923 | A1 * | 10/2003 | Abdelgany | H04B 1/005 370/342 |
| 2007/0161358 | A1 | 7/2007 | Bogdan | |
| 2008/0139132 | A1 * | 6/2008 | Pan | H03F 1/32 455/93 |
| 2008/0144707 | A1 * | 6/2008 | Tsfati | H04B 17/13 375/224 |
| 2008/0242242 | A1 * | 10/2008 | Mele | H04B 1/18 455/90.2 |

(Continued)

FOREIGN PATENT DOCUMENTS

| | | |
|---|---|---|
| EP | 1396942 A2 | 3/2004 |
| KR | 20110051124 A | 5/2011 |
| KR | 20110125060 A | 11/2011 |

OTHER PUBLICATIONS

Extended European Search Report dated Feb. 23, 2016 in connection with European Application No. 15197501.8, 7 pages.

*Primary Examiner* — Nhan Le

(57) ABSTRACT

An electronic device includes a communication circuit. The communication circuit includes at least one receive amplifier configured to connect to an antenna and to low-noise amplify at least a part of a multi-band signal, and a transceiver including a mixer configured to mix the signal low-noise amplified by the at least one receive amplifier, wherein the transceiver is configured to process the multi-band signal.

19 Claims, 9 Drawing Sheets

(56) References Cited

U.S. PATENT DOCUMENTS

| | | | |
|---|---|---|---|
| 2011/0269416 A1* | 11/2011 | Kadoi | H04B 1/0458 |
| | | | 455/127.2 |
| 2012/0013387 A1* | 1/2012 | Sankaranarayanan | ............... |
| | | | H03H 7/422 |
| | | | 327/355 |
| 2014/0139042 A1* | 5/2014 | Choksi | H04B 1/18 |
| | | | 307/112 |
| 2014/0213200 A1 | 7/2014 | Brinkhoff et al. | |
| 2014/0227982 A1* | 8/2014 | Granger-Jones | H04B 7/0404 |
| | | | 455/77 |

* cited by examiner

COMMUNICATION CIRCUIT FOR SUPPORTING COMMUNICATION FUNCTION AND ELECTRONIC DEVICE INCLUDING THE SAME

CROSS-REFERENCE TO RELATED APPLICATION(S) AND CLAIM OF PRIORITY

The present application is related to and claims the benefit under 35 U.S.C. § 119(a) of a Korean patent application filed on Dec. 5, 2014 in the Korean Intellectual Property Office and assigned Serial number 10-2014-0174412, the entire disclosure of which is hereby incorporated by reference.

TECHNICAL FIELD

The present disclosure relates to communication circuits.

BACKGROUND

Each of electronic device may have a communication circuit that includes various modules and elements in connection with supporting a communication function. A transceiver may be disposed in this communication circuit in connection with communicating signals. A plurality of low noise amplifiers (LNAs) are integrated in the transceiver. Meanwhile, recently, as the number of frequency bands (or bands) supported by a communication function of the electronic device increases, the number of LNAs embedded in the transceiver increases in response to the number of the bands.

As described above, if the number of LNAs is increased in connection with supporting a plurality of frequency bands, a design of the transceiver may be complicated, and performance of the transceiver may be degraded. Also, because the transceiver has a high element integration level, the transceiver may be designed with a complementary metal oxide semiconductor (CMOS) process-based technology. LNAs designed according to a CMOS process are favorable to miniaturization and integration. However, a noise figure of each of LNAs is a constant value (e.g., about 2 dB) or more, and each of the LNAs has a supported narrow bandwidth.

Also, LNAs may be used together with matching elements. For example, if the electronic device supports 20 frequency bands and supports a diversity/multiple-input multiple-output (MIMO) technology, 40 LNAs disposed in the transceiver may be used. 120 matching elements (three matching elements per band) may be used in response to the 40 LNAs. As described above, the number of elements associated with supporting a communication function is increased, and wires installed for operating respective elements occupy a broad space on a printed circuit board (PCB). As described above, a communication circuit has many restrictions in designing a product.

SUMMARY

To address the above-discussed deficiencies, it is a primary object to provide at least the advantages described below. Accordingly, the present disclosure provides a communication circuit for supporting a communication function to improve mount properties and save material costs by having a transceiver that is optimized in size because LNAs are not integrated, replacing integrated LNAs with LNAs of high performance, and reducing the number of LNAs. The present disclosure provides an electronic device including the same.

In accordance with an aspect of the present disclosure, a communication circuit is provided. The communication circuit may include at least one receive amplifier configured to connect to an antenna and to low-noise amplify at least a part of a multi-band signal and a transceiver configured to include a mixer configured to mix the multi band signal low-noise amplified by the at least one receive amplifier.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
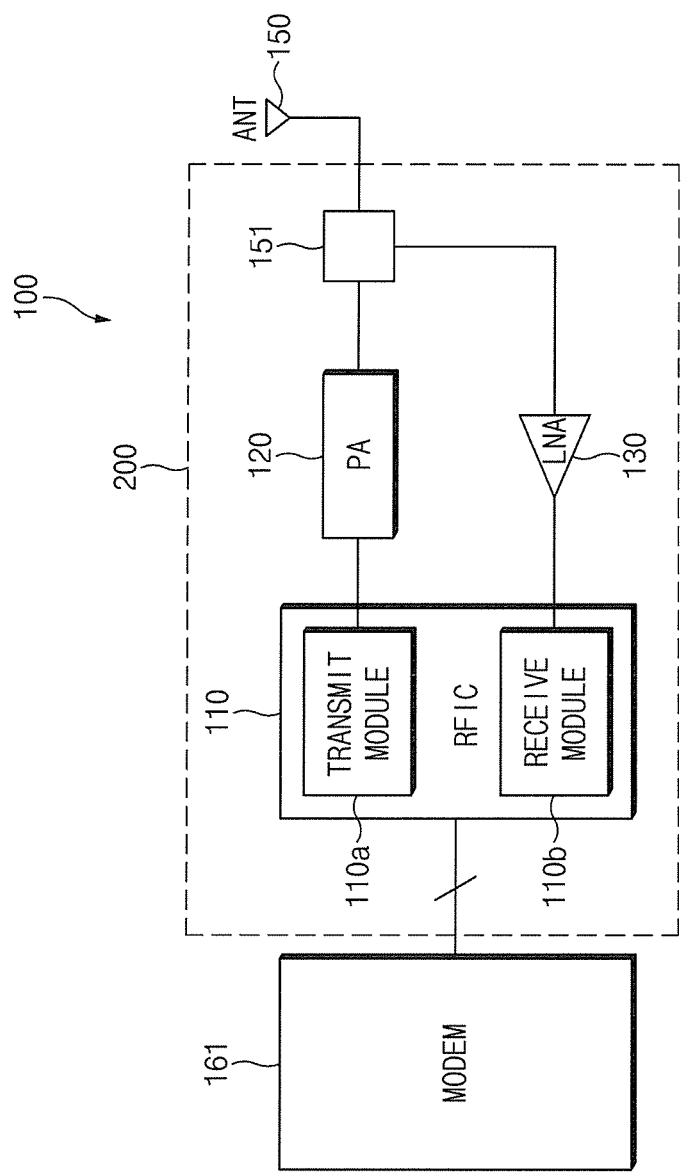
FIG. 1 illustrates a configuration of an electronic device according to various embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Hereinafter, the present disclosure is described with reference to the accompanying drawings. However, the present disclosure is not intended to be limited to the specific embodiments, and it is understood that it should include various modifications, equivalents, and/or alternatives within the scope and technical range of the present disclosure. With respect to the descriptions of the drawings, like reference numerals refer to like elements.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both a first user device and a second user device indicate different user devices from each other irrespective of the order or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element) between the element and the other element.

Depending on the situation, the expression "configured to" used herein may be used as, for example, the expression "suitable for", "having the capacity to", "designed to", "adapted to", "made to", or "capable of". The term "configured to" should not mean only "specifically designed to" hardwarily. Instead, under any situation, the expression "a device configured to" may mean that the device is "capable of" operating together with another device or other components. For example, a "processor configured to perform A, B, and C" may mean a generic-purpose processor (e.g., a central processing unit (CPU) or an application processor) that may perform corresponding operations by executing one or more software programs which stores a dedicated processor (e.g., an embedded processor) for performing a corresponding operation.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

Hereinafter, electronic devices according to various embodiments of the present disclosure will be described with reference to the accompanying drawings. The term "user" used in various embodiments of the present disclosure may refer to a person who uses an electronic device or may refer to a device (e.g., an artificial electronic device) that uses an electronic device.

FIG. 1 illustrates a configuration of an electronic device according to various embodiments of the present disclosure.

Referring to FIG. 1, according to various embodiments of the present disclosure, an electronic device 100 may include a modem 161, a communication circuit 200, and an antenna 150.

In the electronic device 100, a receive amplifier 130 (e.g., a low noise amplifier (LNA)), associated with processing a signal of a radio frequency integrated circuit 110 (RFIC) (e.g., a transceiver), may be disposed in a front-end (or previous stage) of the communication circuit 200 (e.g., back-end of the antenna 150). The receive amplifier 130 may be an LNA that supports a broadband bandwidth and is generated by a gallium arsenide (GaAs) process or a silicon germanium (SiGe) process of high performance. This receive amplifier 130 may have a relatively good noise figure.

As described above, the communication circuit 200 of the electronic device 100 may reduce the number of elements and wires of a matching circuit connected to the receive amplifier 130 and may reduce a size of the RFIC 110 by (i) including the RFIC 110 that does not include a receive amplifier and (ii) arranging the receive amplifier 130 of high performance outside the RFIC 110 to amplify a signal received to the RFIC 110. For example, the electronic device 100 may arrange the receive amplifier 130 of high performance, which supports a multi-band, to process a multi-frequency band. Also, the electronic device 100 may arrange one matching circuit at the corresponding receive amplifier 130. Therefore, elements may be concisely and simply disposed and wired in the electronic device 100 described according to various embodiments of the present disclosure.

The modem 161 may control processing and transmission of a signal used to operate a communication function of the electronic device 100. For example, this modem 161 may module a signal to be transmitted to the outside or may demodulate a signal received from the outside. For example, the modem 161 may output a modulated signal to the communication circuit 200. Also, the modem 161 may demodulate a signal received through the communication circuit 200.

According to various embodiments of the present disclosure, the modem 161 may control a switching state of at least a switching circuit disposed in the communication circuit 200. Also, if an amplifier is disposed in the RFIC 110, the modem 161 may control a gain of the amplifier disposed in the RFIC 110 to play a role as a buffer. Also, the modem 161 may control a switching state of a bypass circuit disposed at a back-end switching circuit (or a next stage switching circuit or an after-edge switching circuit) of a radio frequency (RF) module described below. According to an embodiment of the present disclosure, the modem 161 may control a switching state of a bypass circuit connected in parallel to a receive amplifier in response to a wireless environment of the electronic device 100. If the environment of the electronic device 100 is under a strong electric field of specific strength or more, the modem 161 may control the bypass circuit to be turned on (e.g., be switched on and be bypassed). If the environment of the electronic device 100 is under a weak electric field of less than the specific strength, the modem 161 may control the bypass circuit to be turned off (e.g., be switched off, process a signal through the receive amplifier 130).

According to an embodiment of the present disclosure, the electronic device 100 may include a first signal line 161a disposed between the modem 161 and a divider 151 in connection with controlling the divider 151, a second signal line 161b disposed between a transmit amplifier 120 and the modem 161 in connection with controlling the transmit amplifier 120, and a third signal line 161c disposed between the receive amplifier 130 and the modem 161 in connection with controlling the receive amplifier 130. Each of the first to third signal lines 161a to 161c may play a role in transmitting a control signal generated by the modem 161 to at least one of the divider 151, the transmit amplifier 120, and the receive amplifier 130.

The communication circuit 200 may connect to the modem 161 and may play a role in loading a signal modulated by the modem 161 on a specific transmit frequency. Also, the communication circuit 200 may play a role in converting a signal received from the outside into a signal corresponding to data and transmitting the converted signal to the modem 161. This communication circuit 200 may include, for example, the RFIC 110, the transmit amplifier 120, the receive amplifier 130, and the divider 151. The RFIC 110 may include a transmit modem 110a that transmits a specific frequency with a signal transmitted from the modem 161 to the transmit amplifier 120 and include a receive module 110b that processes a frequency of a signal received through the receive amplifier 130 and transmits the processed signal to the modem 161. For example, the receive module 110b of this RFIC 110 may process a signal transmitted from the one receive amplifier 130 disposed outside the RFIC 110 and may transmit the processed signal to the modem 161 without including a separate receive amplifier.

The transmit amplifier 120 may be disposed between the RFIC 110 and the divider 151. The transmit amplifier 120 may amplify a signal output from the transmit module 110a by a specific level and may output the amplified signal to the antenna 150. An amplification efficiency of the transmit amplifier 120 may be applied in a different way according to a frequency band covered by the transmit amplifier 120, physical properties of the transmit amplifier 120, and a control of the modem 161.

The transmit amplifier 120 may connect to a transmit port of the divider 151, the receive amplifier 130 may connect to a receive port of the divider 151, and the antenna 150 may connect to an antenna port of the divider 151. This divider 151 may play a role in transmitting a signal output through the transmit amplifier 120 to the antenna 150 and transmitting a signal received through the antenna 150 to the receive amplifier 130.

The receive amplifier 130 may be an amplifier that amplifies a low noise region of a receive signal received through the divider 151. The receive amplifier 130 may include one or more receive amplifiers. For example, the receive amplifier 130 may be designed to cover a plurality of bands. Therefore, the receive amplifier 130 may be disposed to selectively connect a plurality of bands.

The antenna 150 may receive or transmit a signal. For example, the antenna 150 may be designed to cover a multi-frequency band.

As described above, according to various embodiments of the present disclosure, the electronic device 100 may include the RFIC 110 that does not include the receive amplifier 130 and may be disposed such that the receive amplifier 130 independently arranged between the RFIC 110 and the antenna 150 covers a multi-band. Therefore, the electronic device 100 may have a relative small or slim appearance by simply maintaining a structure associated with the receive amplifier 130 and reducing a size of the RFIC 110.

As described above, according to various embodiments of the present disclosure, the electronic device may include an antenna configured to communicate at least a part of a multi-band signal, a communication circuit configured to include at least one receive amplifier designated to connect with the antenna and to low-noise amplify the multi-band signal and a transceiver that processes an output signal of the at least one receive amplifier, and a modem configured to modulate or demodulate a signal communicated through the transceiver.

According to various embodiments of the present disclosure, the communication circuit may include a radio frequency (RF) module that includes a transmit amplifier configured to amplify a signal output from the transceiver, a transmit band switching circuit configured to classify and transmit an output signal of the transmit amplifier for each band, a front-end switching circuit configured to connect to the antenna, a duplexer or quadplexer configured to be disposed between the transmit band switching circuit and the front-end switching circuit, a back-end switching circuit configured to connect with the duplexer or quadplexer, and the receive amplifier configured to be disposed at an output end of the back-end switching circuit.

According to various embodiments of the present disclosure, the RF module may include a plurality of RF modules to respectively support bands (e.g., a high band, a low band, a middle band, and the like) including a plurality of frequency bands.

According to various embodiments of the present disclosure, the RF module may include a plurality of back-end switching circuits according to carrier aggregation (CA) support of the plurality of frequency bands. The plurality of back-end switching circuits may connect to a plurality of receive amplifiers, respectively.

According to various embodiments of the present disclosure, the communication circuit of the electronic device may further include at least one bypass circuit respectively connected in parallel to the at least one receive amplifier. If a wireless environment is under a strong electric field of specific strength or more, the modem may control the bypass circuit to be turned on. If the wireless environment is under a weak electric field of less than the specific strength, the modem may control the bypass circuit to be turned off.

Figure 2:
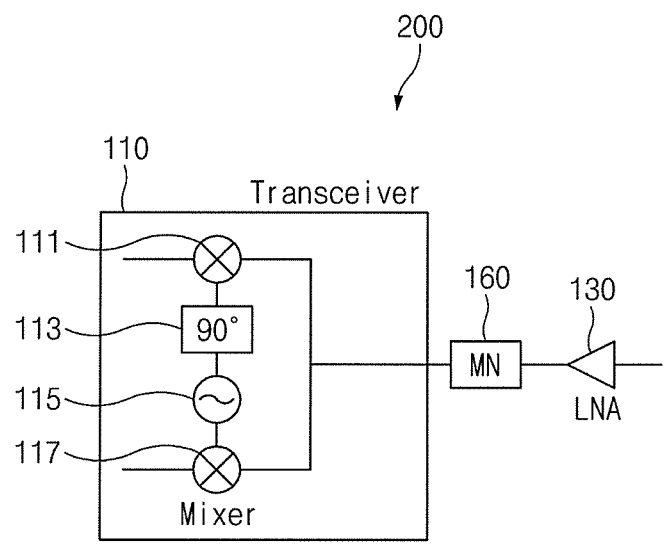
FIG. 2 illustrates a circuit diagram including components of a communication circuit according to various embodiments of the present disclosure.

FIG. 2 illustrates a circuit diagram including components of a communication circuit according to various embodiments of the present disclosure.

Referring to FIG. 2, some of components of a communication circuit 200 may include an RFIC 110, a matching circuit 160, and a receive amplifier 130.

As described above, the RFIC 110 may connect to the modem 161 of FIG. 1 and may support a process of processing a transmit signal and a process of processing a receive signal. In this regard, the RFIC 110 may include a first mixer 111 and a second mixer 117 which are associated with processing a receive signal. The RFIC 110 may include a phase processor 113 and an oscillator 115 that are disposed between the first mixer 111 and the second mixer 117. Each of the first mixer 111 and the second mixer 117 may be a mixer that supports a process of processing a multi-band. The first mixer 111 and the second mixer 117 may connect to, for example, the receive amplifier 130 that covers a multi-band. The first mixer 111, the second mixer 117, and the phase processor 113 may be included in a quadrature mixer. The quadrature mixer may generate an orthogonal downconverting signal (in-phase/quadrature-phase (I/Q) signal) by mixing an oscillator signal with a received signal using the second mixer 117 and mixing an oscillator signal, in which a phase is changed by 90 degrees by the phase processor 113, with a received signal using the first mixer 111.

The matching circuit 160 may be disposed to perform impedance matching of the receive amplifier 130. This matching circuit 160 may be an amplifier disposed such that the receive amplifier 130 covers a multi-band. Therefore, the matching circuit 160 may be designed to perform impedance matching for covering a multi-band. Although not illustrated, the matching circuit 160 may be used to perform impedance matching between other components or circuits. For example, in connection with impedance matching, the matching circuit 160 may be disposed between an antenna 150 and a divider 151 of FIG. 1.

As described above, the receive amplifier 130 may be a low noise amplifier designed to cover a multi-band.

As described above, the communication circuit 200 according to various embodiments of the present disclosure may include a multi-band low noise amplifier (LNA), which supports a multi-band, as the receive amplifier 130 and may include the multi-band RFIC 110 (or the transceiver) that does not include a separate LNA. Also, since the one matching circuit 160 is disposed between the receive amplifier 130 and the RFIC 110, the communication circuit 200 may support more simple connection and may support a plurality of bands.

Figure 3:
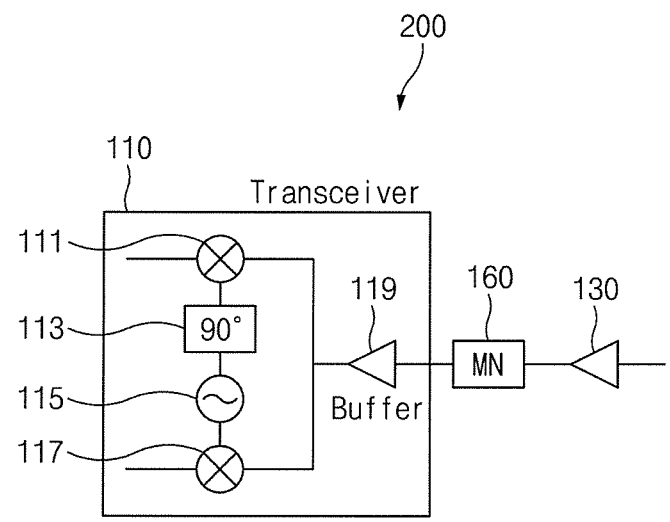
FIG. 3 illustrates a circuit diagram including components of a communication circuit according to various embodiments of the present disclosure.

FIG. 3 illustrates a circuit diagram including components of a communication circuit according to various embodiments of the present disclosure.

Referring to FIG. 3, a communication circuit 200 according to various embodiments of the present disclosure may include an RFIC 110 including a buffer 119, a matching circuit 160, and a receive amplifier 130.

The RFIC 110 may include a first mixer 111, a second mixer 117, a phase processor 113, an oscillator 115, and the buffer 119. Herein, the phase processor 113 and the oscillator 115 may be arranged between the first mixer 111 and the second mixer 117. The buffer 119 may be disposed in common at input ends of the first mixer 111 and the second mixer 117. The first mixer 111, the second mixer 117, and the phase processor 113 may operate as a quadrature mixer.

Operation performance of the RFIC 110 may be changed according to a change of a load of an input front-end of the RFIC 110. For example, a pulling environment in which a frequency of the oscillator 115 is changed may occur according to a change of a load connected to input ends of the first mixer 111 and the second mixer 117. For example, if matching is achieved between the receive amplifier 130, corresponding to an LNA, and the RFIC 110 using the one matching circuit 160, an impedance change of a load connected to an input portion of the RFIC 110 may occur according to a frequency band.

The buffer 119 may be disposed at an input front-end of the RFIC 110 and may play a role in buffering an impedance change of a load for each frequency. For example, the buffer 119 may reduce an influence which the impedance change of the load at the input front-end portion of the RFIC 110 has on elements in the RFIC 110, through its buffering. Therefore, functions of the oscillator 115 and the like may reduce an influence by an impedance change of an external load.

Meanwhile, FIG. 3 illustrates an example in which the buffer 119 is disposed in the RFIC 110. However, the scope and spirit of the present disclosure may not be limited thereto. For example, the buffer 119 may be disposed outside the RFIC 110 to be independent of the RFIC 110 and may be disposed between the matching circuit 160 and the RFIC 110. Roles of the remaining components except for the buffer 119, for example, the RFIC 110, including the first mixer 111, the second mixer 117, and the like, the matching circuit 160, and the receive amplifier 130 corresponding to the LNA may be same as or similar to components described above with reference to FIG. 2.

Figure 4:
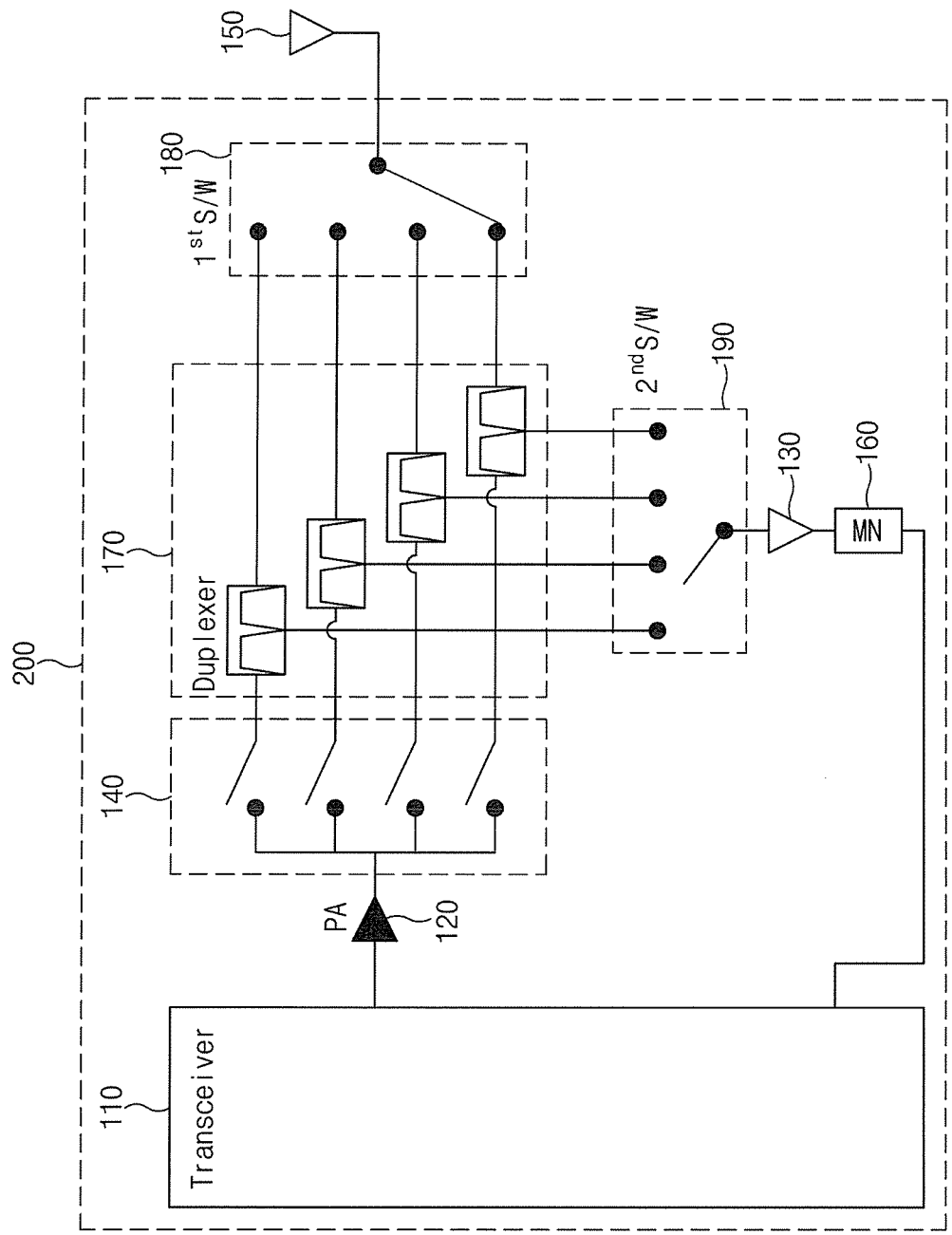
FIG. 4 illustrates a circuit diagram including transmit and receive components of a communication circuit according to various embodiments of the present disclosure.

FIG. 4 illustrates a circuit diagram including transmit and receive components of a communication circuit according to various embodiments of the present disclosure.

Referring to FIG. 4, a communication circuit 200 may include an RFIC 110, a transmit amplifier 120, a receive amplifier 130, a matching circuit 160, a front-end switching circuit 180, a back-end switching circuit 190, a duplexer 170, and a transmit band switching circuit 140.

The communication circuit 200 may support a frequency duplex division (FDD) system. The duplexer 170 of the communication circuit 200 may be used to divide a transmit signal and a receive signal in a specific frequency band. The communication circuit 200 may include the plurality of duplexers 170 for each band to divide a transmit signal and a receive signal for each multi-band.

The communication circuit 200 may have a shape such that the transmit amplifier 120 is arranged between the RFIC 110 and an antenna 150 (or between the RFIC 110 and the transmit band switching circuit 140) and such that the duplexer 170 and the front-end switching circuit 180 are disposed between the transmit amplifier 120 and the antenna 150. Also, the matching circuit 160 may be disposed at one end of the RFIC 110, and the back-end switching circuit 190 may be disposed between the matching circuit 160 and the duplexer 170. Additionally or alternatively, the transmit band switching circuit 140 may be disposed between the transmit amplifier 120 and the duplexer 170 to select signal lines (or ports) associated with a plurality of transmit frequency bands (or bands).

The communication circuit 200 of the above-described structure may receive a multi-band signal through the multi-band antenna 150 which may cover a multi-band. The front-end switching circuit 180 may operate to receive a signal of a specific band under a control of a modem 161 of FIG. 1. For example, the communication circuit 200 may have a state where the front-end switching circuit 180 is selectively connected in response to a band used by the antenna 150 and the duplexer 160. The duplexer 170 may transmit a transmit signal of a specific band to the antenna 150 through the front-end switching circuit 180. The duplexer 170 may transmit a receive signal among transmitted signals to the back-end switching circuit 190. The back-end switching circuit 190 may selectively transmit the receive signal transmitted from the duplexer 170 to the receive amplifier 130 in response to a band.

According to an embodiment of the present disclosure, in connection with processing the transmit signal and the receive signal, the modem 161 may control the transmit band switching circuit 140 and the front-end switching circuit 180 to transmit a signal of a specific band. FIG. 4 illustrates an example in which the transmit band switching band 140 may support four selection bands. However, the scope and spirit of the present disclosure may not be limited thereto. For example, the number of selection bands which may be supported by the transmit band switching circuit 140 may be increased or decreased according to the number of frequency bands supported by the electronic device 100. A duplexer may be additionally used as much as the increased number of selection bands. Selection bands which may be supported by the back-end switching circuit 190 may be also increased in response to the addition of the duplexer.

According to various embodiments of the present disclosure, the modem 161 may control the front-end switching circuit 180 and the back-end switching circuit 190 to operate a receive band among specific frequency bands. Herein, the receive amplifier 130 may connect to the back-end switching circuit 190 that connects a signal line (or a port) associated with one of four selection bands. Therefore, the receive amplifier 130 may be designed as an LNA for multi-band to cover four receive bands. The matching circuit 160, associated with impedance matching of the receive amplifier 130, may be disposed between the receive amplifier 130 and the RFIC 110. Additionally, a buffer 119 described with reference to FIG. 3 may be arranged between the RFIC 110 and the matching circuit 160 to improve performance by reducing influence by a change of a load.

Figure 5:
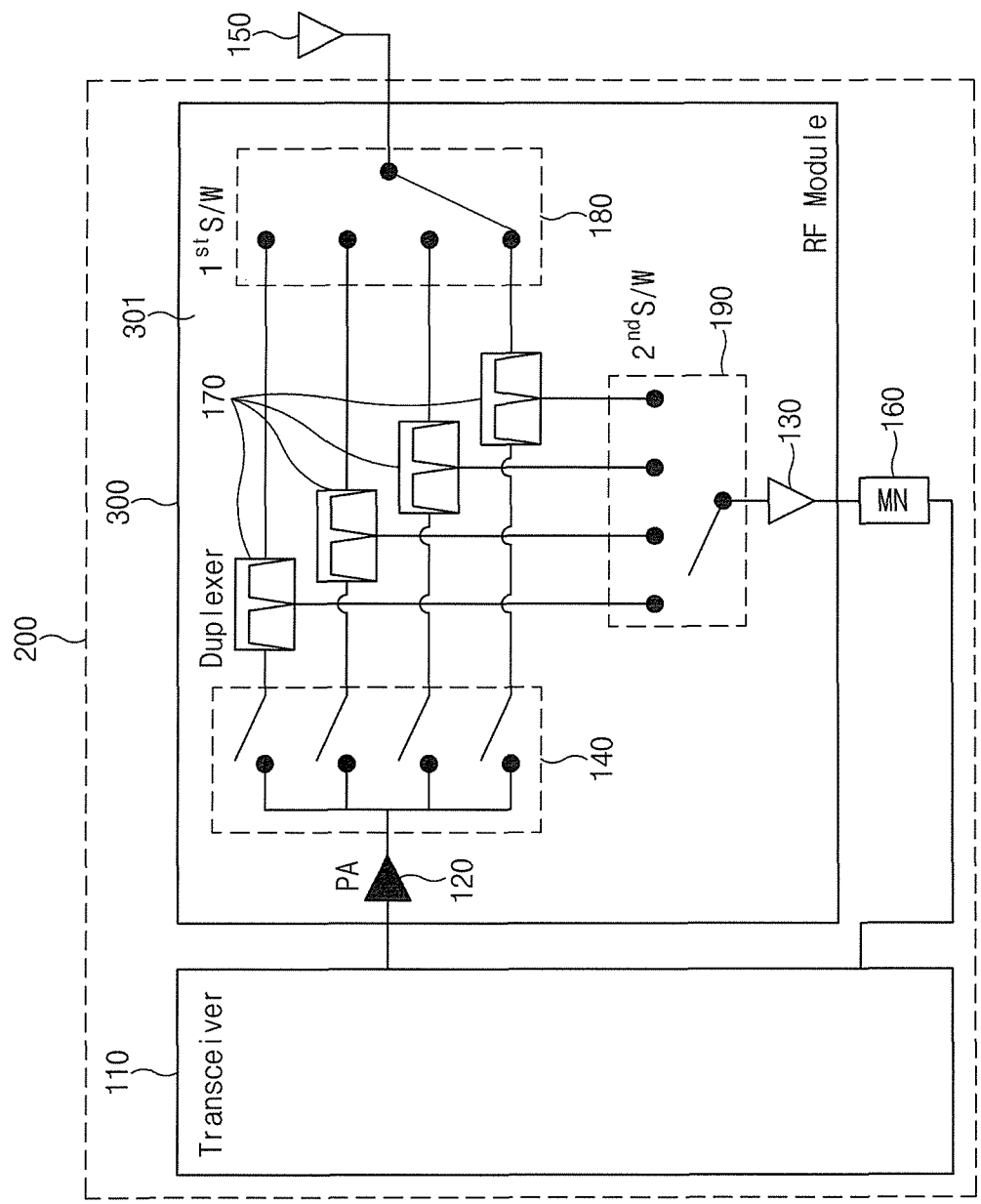
FIG. 5 illustrates a circuit diagram including a configuration of a communication circuit of a chip type according to various embodiments of the present disclosure.

FIG. 5 illustrates a circuit diagram including a configuration of a communication circuit of a chip type according to various embodiments of the present disclosure.

Referring to FIG. 5, a communication circuit 200 may include an RFIC 110, an RF module 300, and a matching circuit 160. This communication circuit 200 of FIG. 5 may include the same components as that of the communication circuit 200 described with reference to FIG. 4, except for the RF module 300. Respective components of FIG. 5 may play the same role as components described with reference to FIG. 4.

The RF module 300 may include a transmit amplifier 120, a duplexer 170, a front-end switching circuit 180, a back-end switching circuit 190, and a receive amplifier 130. This RF module 300 may have a shape in which the transmit amplifier 120, the duplexer 170, the front-end switching circuit 180, the back-end switching circuit 190, and the receive amplifier 130 are integrated. In this regard, the RF module 300 may have a structure 301 (e.g., a printed circuit board (PCB), a copper plate, an epoxy structure, or a ceramic structure, and the like) in which the transmit amplifier 120, the duplexer 170, the front-end switching circuit 180, the back-end switching circuit 190, and the receive amplifier 130 may be disposed. The transmit amplifier 120, the duplexer 170, the front-end switching circuit 180, the back-end switching circuit 190, and the receive amplifier 130 may be disposed in the structure 301, and wires that connect the respective elements may be arranged in the structure 301.

A circuit associated with an electronic device 100 of FIG. 1 may be more smoothly designed according to the RF module 300 having the structure 301. According to an embodiment of the present disclosure, the transmit amplifier 120, the duplexer 170, the receive amplifier 130, the transmit band switching circuit 140, the front-end switching circuit 180, and the back-end switching circuit 190 may be integrated and modularized. The structure of the above-mentioned RF module 300 may improve system performance (e.g., a receive band noise, isolation, and the like) by reducing an external influence provided to respective elements. Also, if respective elements are independently mounted, since each component is differently disposed for each specification, it may be difficult to perform a universal design. However, as described above, since the RF module 300 integrated through the structure 301 has a common pin-map, it may be easy to perform a universal design. Also, the used number of components may be reduced due to reducing the matching circuit 160 and the like. Therefore, the communication circuit 200 according to various embodiments of the present disclosure may reduce a mount area and may save material costs.

A transmit path of the above-described communication circuit 200 may include the RFIC 110, the RF module 300, and the antenna 150. A receive path of the communication circuit 200 may include the antenna 150, the RF module 300, the matching circuit 160, and the RFIC 110. According to various embodiments of the present disclosure, the matching circuit 160 may be configured to be included in the structure 301 which includes the RF module 300 configuration.

Figure 6:
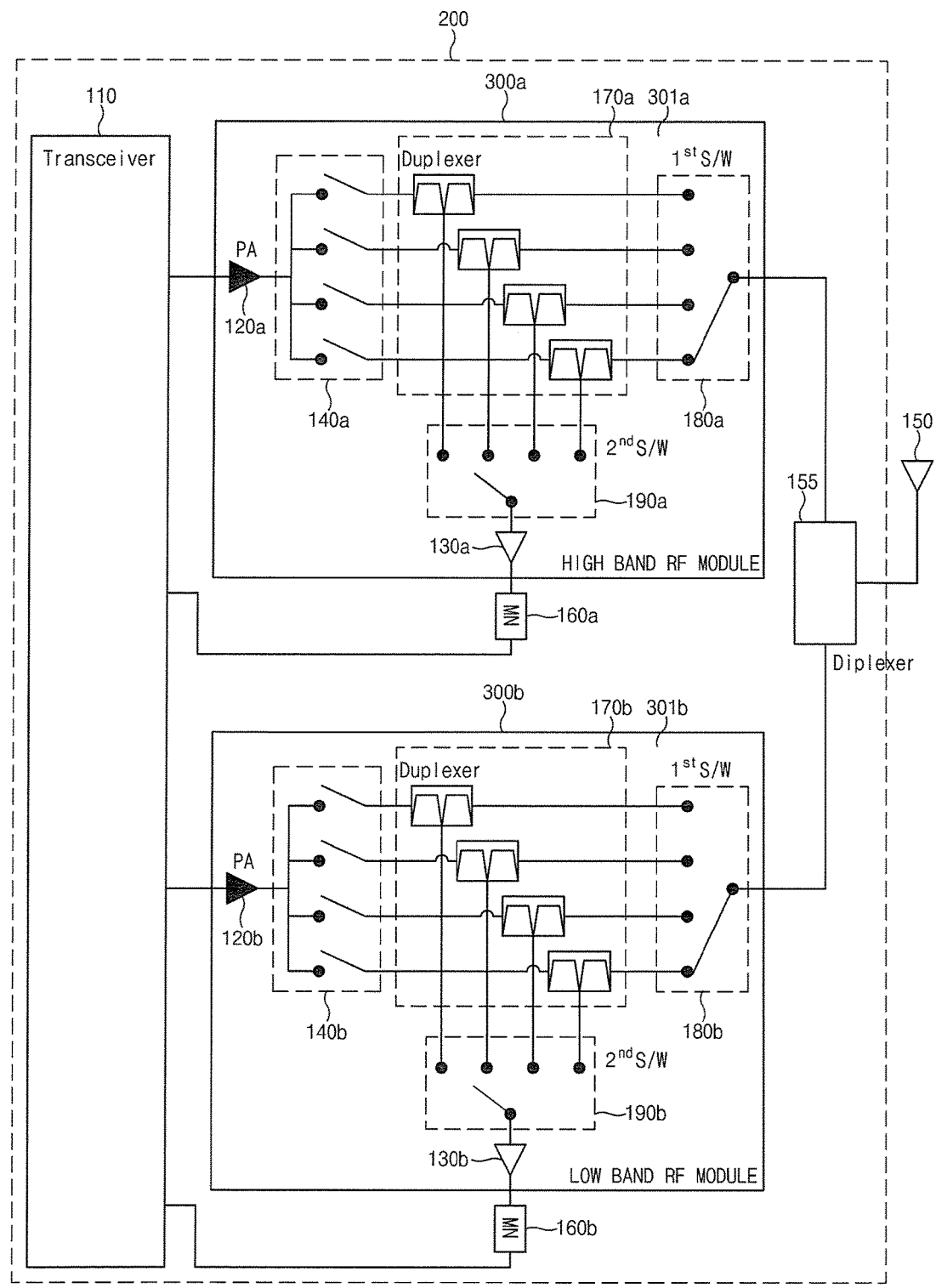
FIG. 6 illustrates a circuit diagram including a configuration of a communication circuit for supporting a multi-band according to various embodiments of the present disclosure.

FIG. 6 illustrates a circuit diagram including a configuration of a communication circuit for supporting a multi-band according to various embodiments of the present disclosure.

Referring to FIG. 6, a communication circuit 200 may include an RFIC 110, a high band RF module 300a, a low band RF module 300b, a first matching circuit 160a, a second matching circuit 160b, and a diplexer 155.

The high band RF module 300a may include a first transmit amplifier 120a, a first transmit band switching circuit 140a, a first front-end switching circuit 180a, a first back-end switching circuit 190a, a first duplexer 170a, and a first receive amplifier 130a. The high band RF module 300a may be integrated and disposed in a first structure 301a. As described above, the first structure 301a may be a PCB, a copper plate, an epoxy structure, or a ceramic structure.

The low band RF module 300b may include a second transmit amplifier 120b, a second transmit band switching circuit 140b, a second front-end switching circuit 180b, a second back-end switching circuit 190b, a second duplexer 170b, and a second receive amplifier 130b. The low band RF module 300b may be integrated and disposed in a second structure 301b to be similar to the high band RF module 300a.

The above-mentioned communication circuit 200 may include a first transmit path that includes the RFIC 110, the first transmit amplifier 120a, the first transmit band switching circuit 140a, the first duplexer 170a, the first front-end switching circuit 180a, the diplexer 155, and the antenna 150. Also, the communication circuit 200 may include a second transmit path that includes the RFIC 110, the second transmit amplifier 120b, the second transmit band switching circuit 140b, the second duplexer 170b, the second front-end switching circuit 180b, the diplexer 155, and the antenna 150.

Also, the communication circuit 200 may include a first receive path that includes the antenna 150, the diplexer 155, the first front-end switching circuit 180a, the first duplexer 170a, the first back-end switching circuit 190a, the first receive amplifier 130a, the first matching circuit 160a, and the RFIC 110. The communication circuit 200 may include a second receive path that includes the antenna 150, the diplexer 155, the second front-end switching circuit 180b, the second duplexer 170b, the second back-end switching circuit 190b, the second receive amplifier 130b, the second matching circuit 160b, and the RFIC 110.

As described above, if an electronic device 100 of FIG. 1 supports a plurality of bands among high bands and supports a plurality of bands among low bands, the communication circuit 200 may include the plurality of RF modules 300a and 300b. Since a receive amplifier and a matching circuit are disposed in each of the RF modules 300a and 300b, wires and elements may be simply disposed.

The first and second receive amplifiers 130a and 130b may include a receive amplifier that supports a plurality of frequency bands in a low band and a receive amplifier that supports a plurality of frequency bands in a high band. The first and second transmit amplifiers 120a and 120b may include a transmit amplifier that supports a plurality of frequency bands in a low band and a transmit amplifier that supports a plurality of frequency bands in a high band. The diplexer 155 may transmit a high band signal in a signal received through the antenna 150 to the high band RF module 300a and may transmit a low band signal in the signal received through the antenna 150 to the low band RF module 300b.

According to various embodiments of the present disclosure, if the electronic device 100 is designed to support more various frequency bands, the communication circuit 200 may include a greater number of RF modules to support specific frequency bands as well as the high band RF module 300a and the low band RF module 300b. Each of the RF modules may include, for example, one receive amplifier or the specific number of receive amplifiers.

Also, according to various embodiments of the present disclosure, FIG. 6 illustrates an example in which the electronic device 100 includes the elements integrated on the structures. However, the scope and spirit of the present disclosure may not be limited thereto. For example, the above-mentioned RF modules may operate by being disposed on a main PCB without being integrated on separate structures or being formed as a chip shape. Alternatively, the RF modules in the electronic device 100 may be configured with a shape in which independent elements are disposed without having a separate module structure.

Figure 7:
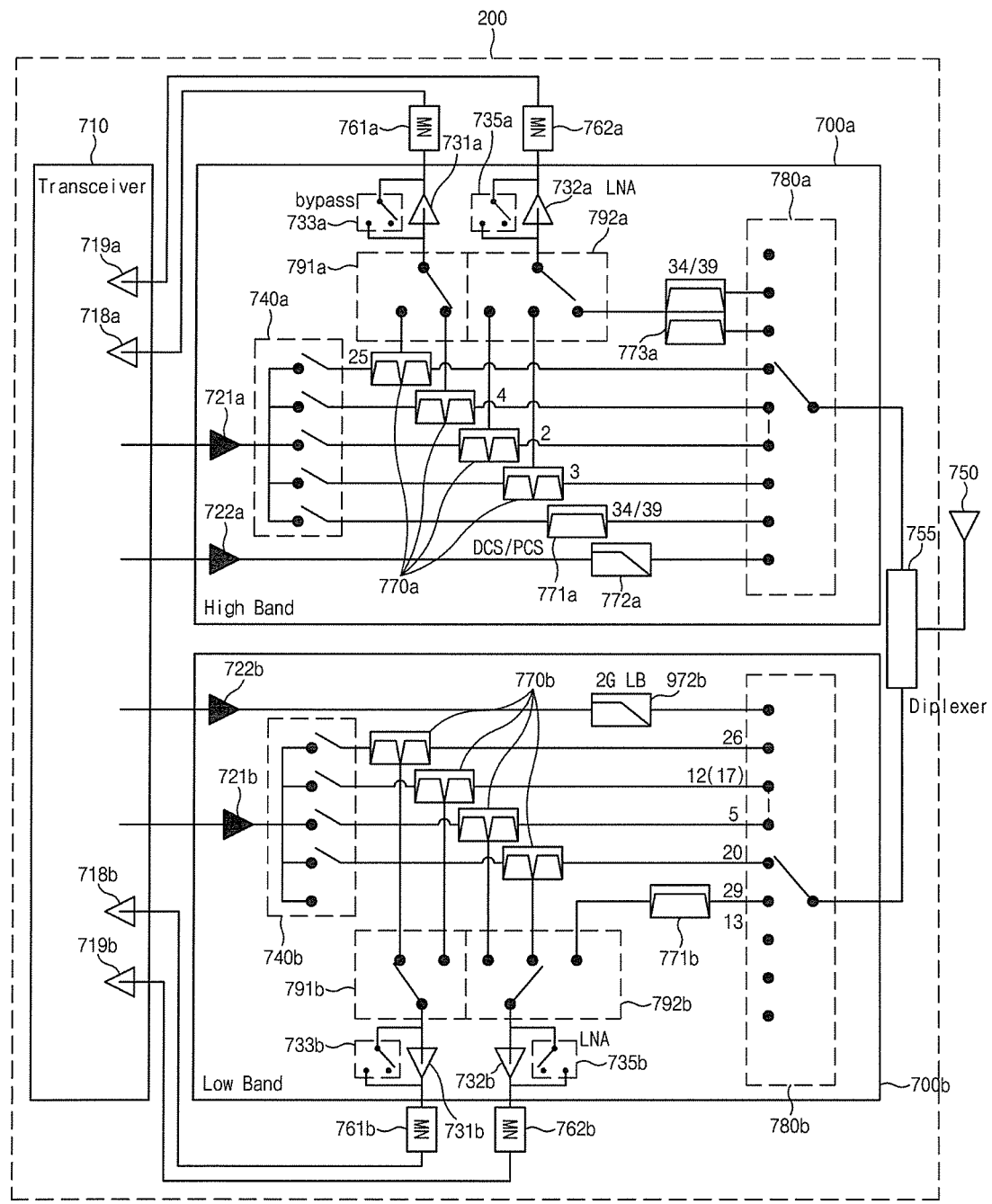
FIG. 7 illustrates a circuit diagram including a configuration of a communication circuit for supporting multi-band carrier aggregation (CA) according to various embodiments of the present disclosure.

FIG. 7 illustrates a circuit diagram including a configuration of a communication circuit for supporting multi-band carrier aggregation (CA) according to various embodiments of the present disclosure.

Referring to FIG. 7, a communication circuit 200 may include an RFIC 710, a high band RF module 700a, a low band RF module 700b, a first high band matching circuit 761a, a second high band matching circuit 762a, a first low band matching circuit 761b, a second low band matching circuit 762b, and a diplexer 755. Herein, the first and second high band matching circuits 761a and 762a may be designed with different values according to characteristics of first and second high band receive amplifiers 731a and 732a that are respectively connected thereto. The first and second low band matching circuits 761b and 762b may be designed with different values according to characteristics of first and second low band receive amplifiers 731b and 732b that are respectively connected thereto.

The high band RF module 700a may include a first high band transmit amplifier 721a, a second high band transmit amplifier 722a, a transmit high band switching circuit 740a, a high band front-end switching circuit 780a, a first high band back-end switching circuit 791a, a second high band back-end switching circuit 792a, high band duplexers 770a, a high band pass filter (BPF) 771a, a high band low pass filter (LPF) 772a, the first high band receive amplifier 731a, the second high band receive amplifier 732a, a first high band bypass circuit 733a, and a second high band bypass circuit 735a.

The first high band transmit amplifier 721a may selectively connect with the high band duplexers 770a and the high band BPF 771a of a digital communication system/ personal communication system (DCS/PCS) communication frequency band through the transmit high band switching circuit 740a. The second high band transmit amplifier 722a may connect with the high band LPF 772a. The transmit high band switching circuit 740a may support, for example, five selection bands (e.g., may selectively connect signal lines associated with the five selection bands). The five selection bands may include, for example, bands corresponding to a (frequency) band 25, a band 4, a band 2, a band 3, and a band 34/39 that are described in a long term evolution (LTE) communication frequency band standard.

According to an embodiment of the present disclosure, the high band duplexers 770a, which supports the band 25 and the band 4, may connect to the first high band back-end switching circuit 791a. The first high band back-end switching circuit 791a may selectively connect signal lines associated with two selection bands. The two selection bands may correspond to the above-mentioned bands 25 and 4. Also, the high band duplexers 770a, which support the band 2 and the band 3, may connect to the second high band back-end switching circuit 792a. The second high band back-end switching circuits 792a may selectively connect signal lines associated with selection bands corresponding to the band 2, the band 3, and the band 34/39. The high band front-end switching circuit 780a may support, for example, nine selection bands. Some of the nine selection bands may include the above-mentioned bands 25, 4, 2, 3, and 34/39 (transmit bands), a frequency band connected with a DCS/PCS, and the band 34/39 (receive band). Herein, signal lines which support the band 2 and the band 4 may be selectively wired in connection with CA support. In this regard, the high band front-end switching circuit 780a may include a high band switch 781a which may simultaneously or separately connect ports assigned to the band 2 and the band 4 with a port connected to the diplexer 755 or the antenna 750.

The first high band back-end switching circuit 791a may connect to the first high band receive amplifier 731a. The high band bypass circuit 733a may connect in parallel to the first high band receive amplifier 731a. A state of the first high band bypass circuit 733a may be changed according to a wireless environment of an electronic device 100 of FIG. 1. For example, the first high band bypass circuit 733a may operate under a control of a modem 161 of FIG. 1. According to an embodiment of the present disclosure, if a wireless environment is under a strong electric field of specific strength or more, the modem 161 may turn on the first high band bypass circuit 733a. The first high band bypass circuit 733a may bypass a signal received through the first high band back-end switching circuit 791a without passing through the first high band receive amplifier 731a. Also, if the wireless environment is under a weak electric field of less than the specific strength, the modem 161 may turn off the first high band bypass circuit 733a and may output a signal received through the first high band back-end switching circuit 791a through the first high band receive amplifier 731a.

The first high band receive amplifier 731a may be designed to cover frequency bands corresponding to, for example, the band 25 and the band 4. The first high band back-end switching circuit 791a may connect to the RFIC 710 through the first high band matching circuit 761a. The RFIC 710 may include a first high band buffer 718a connected with the first high band matching circuit 761a.

The second high band back-end switching circuit 792a may connect to the second high band receive amplifier 732a. The second high band bypass circuit 735a may connect in parallel to the second high band receive amplifier 732a. The second high band bypass circuit 735a may play the same role as the above-mentioned first high band bypass circuit 733a. For example, the second high band bypass circuit 735a may be turned on in a strong electric field of specific strength or more under a control of the modem 161 and may transmit a signal received through the second high band back-end switching circuit 792a to the RFIC 710 without passing through the second high band receive amplifier 732a. Also, if the second high band bypass circuit 735a is turned off in a weak electric field of less than the specific strength under a control of the modem 161 to transmit a signal received through the second high band back-end switching circuit 792a to the RFIC 710 through the second high band receive amplifier 732a.

The second high band receive amplifier 732a may be designed to cover frequency bands corresponding to, for example, the band 2, the band 3, and the band 34/39. The second high band back-end switching circuit 792a may connect to the RFIC 710 through the second high band matching circuit 762a. The RFIC 710 may include a second high band buffer 719a connected with the second high band matching circuit 762a. The first high band buffer 718a and the second high band buffer 719a may play a role in reducing an influence by a change of a front-end load of the RFIC 710 (e.g., a change of a load generated at the first high band matching circuit 761a and the second high band matching circuit 762a as the first high band receive amplifier 731a and the second high band receive amplifier 732b cover a multi-band).

The low band RF module 700b may include a first low band transmit amplifier 721b, a second low band transmit amplifier 722b, a transmit low band switching circuit 740b, a low band front-end switching circuit 780b, a first low band back-end switching circuit 791b, a second low band back-end switching circuit 792b, low band duplexers 770b, a low band BPF 771b, a low band LPF 972b, the first low band receive amplifier 731b, the second low band receive amplifier 732b, a first low band bypass circuit 733b, and a second low band bypass circuit 735b. Meanwhile, a first low band matching circuit 761b may connect to the RFIC 710 through a first low band buffer 718b, and a second low band matching circuit 762b may connect to the RFIC 710 through a second low band buffer 719b.

The first low band transmit amplifier 721b may selectively connect with the low band duplexers 770b through the transmit low band switching circuit 740b. The second low band transmit amplifier 722b may connect to a low band LPF 972b. The transmit low band switching circuit 740b may support, for example, five selection bands to be similar to the transmit high band switching circuit 740a. The five selection bands may include, for example, bands corresponding to the band 26, the band 12 (17), the band 5, the band 20, and the band 29/13 in the LTE communication frequency band standard.

According to an embodiment of the present disclosure, the duplexers 770b that support the band 26 and the band 12 (17) may connect to the first low band back-end switching circuit 791b. Also, the low band duplexers 770b that support the band 5 and the band 20 and the low band BPF 771b that supports the band 29/13 may connect to the second low band back-end switching circuit 792b. The first low band back-end switching circuit 791b may selectively connect signal lines associated with two bands, that is, the band 26 and the band 12/(17). The second low band back-end switching circuit 792b may selectively connect signal lines associated with three bands including the band 5, the band 20, and the band 29/13. The first low band back-end switching circuit 791b may connect to the first low band receive amplifier 731b.

The first low band bypass circuit 733b may connect in parallel to the first low band receive amplifier 731b. If a wireless environment is under a strong electric field of specific strength or more, the first low band bypass circuit 733b may transmit an output signal of the first low band back-end switching circuit 791b to the RFIC 710 without passing through the first low band receive amplifier 731b. Also, the second low band bypass circuit 735b may connect in parallel to the second low band receive amplifier 732b. If the wireless environment is under a strong electric field of the specific strength or more, the second low band bypass circuit 735b may be turned on. If the wireless environment is under a weak electric field of less than the specific strength, the second low band bypass circuit 735b may be turned off. The low band front-end switching circuit 780b may support nine selection bands to be similar to the high band front-end switching circuit 780a. The low band front-end switching circuit 780b may include a low band switch 781b which may simultaneously or separately connect ports assigned to the band 12 (17) and the band 5 with a port connected to the diplexer 755 or the antenna 750.

The electronic device 100 that includes the high band RF module 700a and the low band RF module 700b of the above-mentioned structure may support CA of an adjacent band according to a CA combination. For example, in case of the band 2/4 or the band 5/17, the electronic device 100 may include wires that connect back-end switching circuits to be separated from respective bands and connect a plurality of receive amplifiers to separately connect to corresponding bands.

If the electronic device 100 operates such that the band 5 and the band 17 operate as CA, all of the first low band back-end switching circuit 791b, the second low band back-end switching circuit 792b, the first low band receive amplifier 731b, and the second low band receive amplifier 732b may operate and process a receive operation. According to various embodiments of the present disclosure, the low band front-end switching circuit 780b may simultaneously connect the duplexers 770b, which support the band 5 and the band 12 (17), with the antenna 750 or the diplexer 755 to perform a CA operation.

If the electronic device 100 operates such that the band 2 and the band 4 operates as CA, all of the first high band back-end switching circuit 791a, the second high band back-end switching circuit 792a, the first high band receive amplifier 731a, and the second high band receive amplifier 732a may operate and process a receive operation. According to various embodiments of the present disclosure, the high band front-end switching circuit 780a may simultaneously connect the duplexers 770a, which support the band 2 and the band 4, with the antenna or the diplexer 755 to perform a CA operation.

The high band or the low band described above is divided in an arbitrary way with respect to frequency bands supported by the electronic device 100. The high band or the low band may not be limited to a specific frequency band. Also, the various bands (or frequency bands) described above are exemplified as being divided and disposed in the high band and the low band. However, various embodiments of the present disclosure may not be limited thereto. For example, various bands may be classified into arbitrary band groups, and a plurality of bands in each of the classified band groups may be classified into a plurality of sub-groups. The classified bands may selectively connect to one receive amplifier. Therefore, band groups may be classified with respect to multi-bands which may be covered by each of receive amplifiers designed to cover multi-bands, and a high band and a low band may be classified according to the classified band groups. Therefore, since the high band and the low band classify various bands in an arbitrary way in response to a frequency characteristic, they may be changed or redesigned by intention of a designer and the like.

Figure 8:
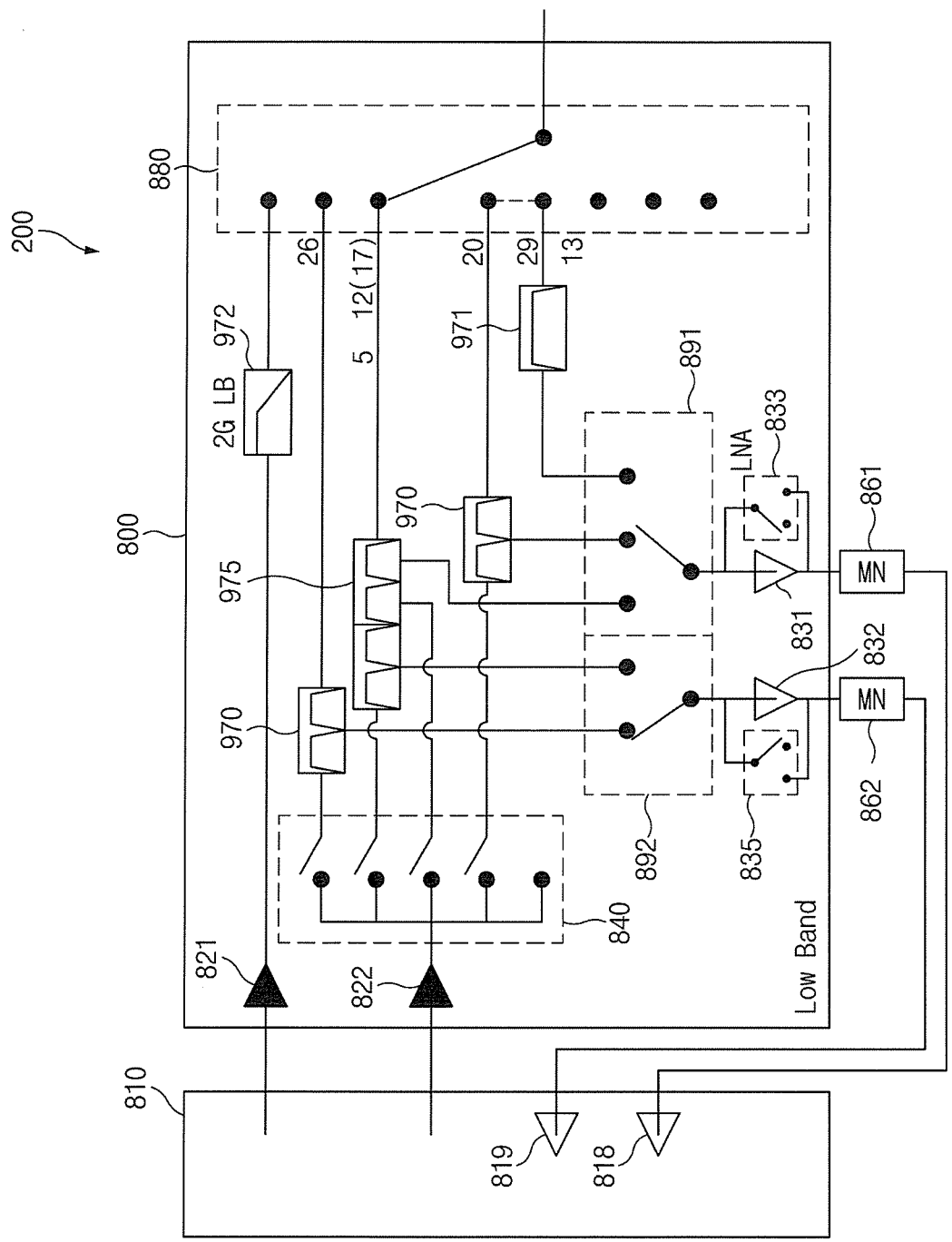
FIG. 8 illustrates a circuit diagram including components of a communication circuit according to various embodiments of the present disclosure.

FIG. 8 illustrates a circuit diagram including components of a communication circuit according to various embodiments of the present disclosure.

Referring to FIG. 8, a communication circuit 200 may include an RFIC 810 and an RF module 800. The RF module 800 described below may be a module designed to process a specific frequency band such as a low band or a high band.

The RF module 800 may include a first transmit amplifier 821, a second transmit amplifier 822, a transmit band switching circuit 840, a front-end switching circuit 880, a first back-end switching circuit 891, a second back-end switching circuit 892, duplexers 970, a quadplexer 975, a BPF 971, an LPF 972, a first receive amplifier 831, a second receive amplifier 832, a first bypass circuit 833, and a second bypass circuit 835. The communication circuit 200 having the above-mentioned components may include the same components as those of a low band RF module 700b of a communication circuit 200 described with reference to FIG. 7, except for the quadplexer 975. As shown in FIG. 8, the quadplexer 975 may connect between the transmit band switching circuit 840 and the front-end switching circuit 880 and may be disposed to be responsible for the band 5, the band 12, and the band 17. One port of this quadplexer 975 may connect to the first back-end switching circuit 891 and another port of the quadplexer 975 may connect to the second back-end switching circuit 892. The first back-end switching circuit 891 may connect to the first receive amplifier 831 and a first matching circuit 861, and the second back-end switching circuit 892 may connect to the second receive amplifier 832 and a second matching circuit 862. The first bypass circuit 833 may connect in parallel to the first receive amplifier 831, and the second bypass circuit 835 may connect in parallel to the second receive amplifier 832. The first bypass circuit 833 and the second bypass circuit 835 may be turned on or off according to a change of a wireless environment (e.g., a strong electric field of specific strength or more or a weak electric field of less than specific strength) in response to a control of a modem 161 of FIG. 1 such that output signals of the first and second back-end switching circuits 891 and 891 pass through the first and second receive amplifiers 831 and 832, respectively or are bypassed without passing through the first and second receive amplifiers 831 and 832.

The RFIC 810 may include a first buffer 818 and a second buffer 819. The first buffer 818 may connect to the first matching circuit 861, which is connected to an output end of the first back-end switching circuit 891, and may connect to the second matching circuit 862 connected to an output end of the second back-end switching circuit 892. The first matching circuit 861 and the second matching circuit 862 may be designed to correspond to characteristics of the first and second receive amplifiers 831 and 832. Each of the first buffer 818 and the second buffer 819 that are included in the RFIC 810 may operate as a buffer without performing an amplification function.

According to various embodiments of the present disclosure, the first buffer 818 and the second buffer 819, included in the RFIC 810, may play a role as an LNA under a control of the modem 161 to be used to obtain a gain of a received signal. Alternatively, according to various embodiments of the present disclosure, the first buffer 818 and the second buffer 819 may be designed such that the first and second bypass circuits 833 and 835 are turned on while each of the first buffer 818 and the second buffer 819 that are included in the RFIC 810 is used as an LNA not to operate the first receive amplifier 831 and the second receive amplifier 832. This operation may be adjusted according to a level of a gain of a received signal. For example, if the first and second bypass circuits 833 and 835 are turned on, signals outputted through the first and second back-end switching circuits 891 and 892 may be bypassed without passing through the first and second receive amplifiers 831 and 832. A signal transmitted to the RFIC 810 may be buffered by the first and second buffers 818 and 819 and may then be processed in the RFIC 810. Therefore, an electronic device 100 of FIG. 1 may reduce non-linearity which may occur in active elements, performance decline due to current consumption, and the increase of current consumption.

As described above, the communication circuit 200 may improve performance decline or the increase of current consumption by performing low noise amplification using at least one of a receive amplifier or a buffer or performing control to omit low noise amplification, according to a peripheral wireless environment. For example, the modem 161 of the electronic device 100 may evaluate a wireless environment (e.g., a received signal strength indication (RSSI), a reference signal received power (RSRP), a reference signal received quality (RSRQ), and the like). If the wireless environment is under a strong electric field of specific strength or more, the modem 161 may perform control not to pass through a receive amplifier. Also, if the wireless environment is under a weak electric field of less than the specific strength, the modem 161 of the electronic device 100 may selectively use at least one of a receive amplifier or a buffer that is independently disposed. For example, the electronic device 100 may perform low noise amplification using only the receive amplifier or using the receive amplifier and the buffer according to a stage of the weak electric field.

Figure 9:
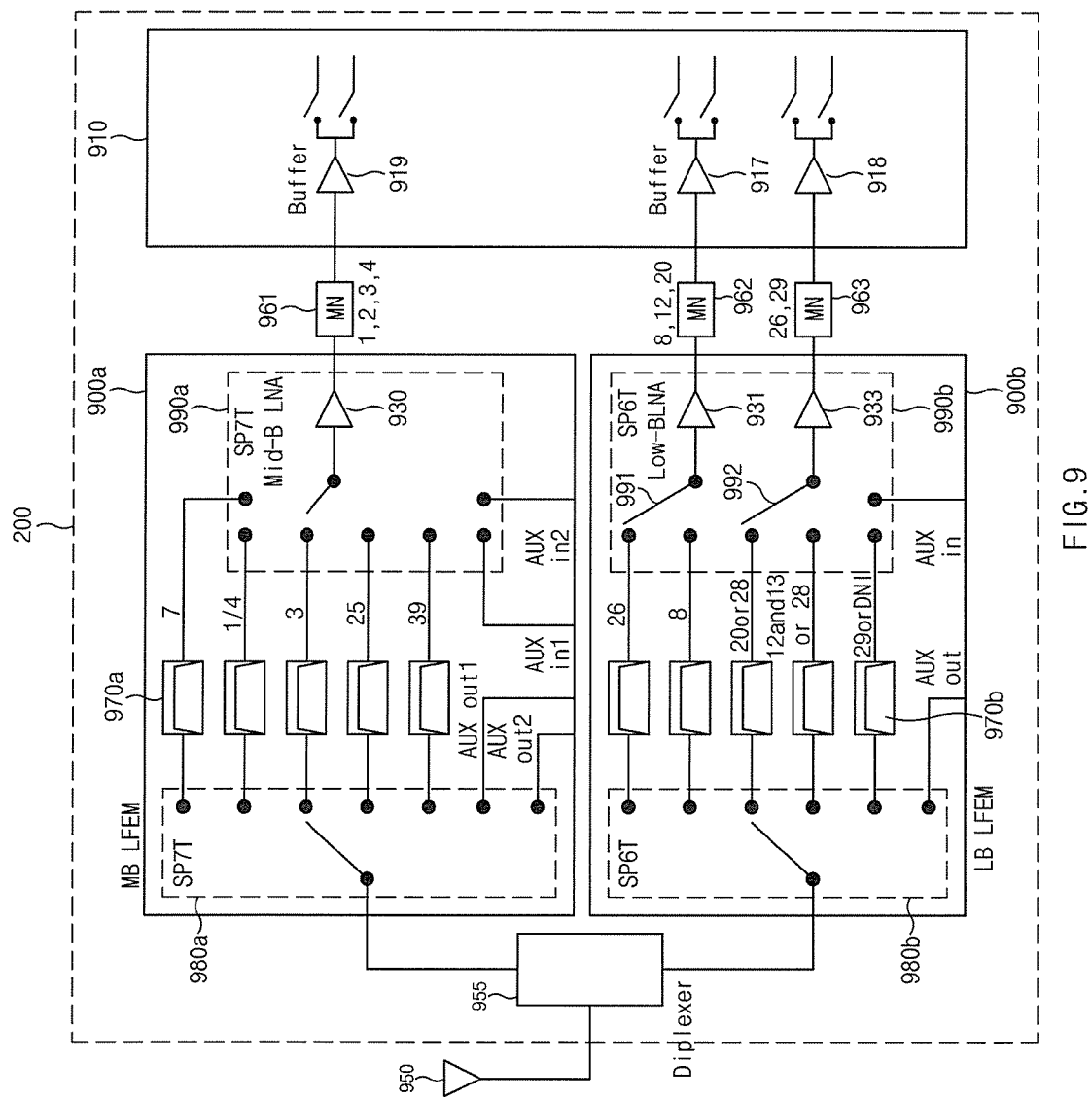
FIG. 9 illustrates a circuit diagram including components of a low-band communication circuit according to various embodiments of the present disclosure.

FIG. 9 illustrates a circuit diagram including components of a low-band communication circuit according to various embodiments of the present disclosure.

Referring to FIG. 9, some of components of a communication circuit 200, for example, receive-side modules may include an RFIC 910, a middle band RF module 900a, a low band RF module 900b, a diplexer 955, an antenna 950, a first receive matching circuit 961, a second receive matching circuit 962, and a third receive matching circuit 963. According to various embodiments of the present disclosure, an electronic device 100, such as a long term evolution (LTE) communication device, which operates a plurality of antennas may include a dedicated transmit and receive module and a dedicated receive module. The communication circuit 200 shown in FIG. 9 is exemplified as including only components of the dedicated receive module. The dedicated transmit and receive module may be implemented by various embodiments of the present disclosure described above. Herein, the RFIC 910 may be included for the purpose of processing a signal received through the antenna 950. Therefore, a separate RFIC may be configured to process the transmission and reception of signals. Alternatively, an RFIC, including a module for processing the transmission and reception of signals and a module for processing only the reception of signals, may be disposed.

The middle band RF module 900a may include a middle band front-end switching circuit 980a, middle band BPFs 970a, and a middle band back-end switching circuit 990a. The middle band front-end switching circuit 980a may be configured to connect to the diplexer 955 and support at least one selection band, for example, seven selection bands. The selection bands may connect with the middle band BPFs 970a disposed at signal lines (or ports) of various bands, such as a band 7, a band 1/4, a band 3, a band 25, and a band 39. Additionally, selection bands supported by the middle band front-end switching circuit 980a may include the above-mentioned 5 bands. An auxiliary output 1 AUX out 1 and an auxiliary output AUX out 2 may be used in connection with operating an external filter.

The middle band back-end switching circuit 990a may be configured to support the selection bands supported by the middle band front-end switching circuit 980a, for example, the seven selection bands. Signal lines associated with some of the selection bands may connect with, for example, the middle band BPFs 970a, which support the band 7, the band 1/4, the band 3, the band 25, and the band 39, respectively. Also, an auxiliary input 1 AUX in 1 and an auxiliary input 2 AUX in 2 may be used in connection with operating an external filter. An output end of the middle band back-end switching circuit 990a may connect to an input end of a middle band receive amplifier 930 that performs a low noise amplification function. The middle band receive amplifier 930 may connect to the first receive matching circuit 961. The first receive matching circuit 961 may connect to a first receive buffer 919 disposed in the RFIC 910.

The low band RF module 900b may include a low band front-end switching circuit 980b, low band BPFs 970b, and a low band back-end switching circuit 990b. The low band back-end switching circuit 990b may include a first switch 991, a second switch 992, a first low band receive amplifier 931, and a second low band receive amplifier 933. For example, the low band RF module 900b may be configured to cover the band 26, the band 8, the band 20 or 28, the band 12 and 13 or 28, and the band 29. In this regard, the low band front-end switching circuit 980b may support, for example, six selection bands. Signal lines associated with five selection bands may connect with the low band BPFs 970b associated with the bands. A signal line associated with one selection band may connect to an auxiliary output AUX out. The low band front-end switching circuit 980b may include a selection switch 981b which may continuously or separately connect ports assigned to the band 8 and the band 20 or 28 with a port connected to the diplexer 955 or the antenna 950. The low band back-end switching circuit 990b may be configured to support, for example, six selection bands. Signal lines associated with five of the six selection bands may connect to the low band BPFs 970b, and a signal line associated with one of the six selection bands may connect to an auxiliary input AUX in. For example, one end of the first switch 991 included in the low band back-end switching circuit 990b may connect with the low band BPFs 970b which support the band 26 and the band 8, and the other end of the first switch 991 may connect to an input end of the first low band receive amplifier 931. One end of the second switch 992 may connect with the low band BPFs 970b which support the band 20 or 28, the band 12 and 13 or 28, and the band 29, and the other end of the second switch 992 may connect to an input end of the second low band receive amplifier 933. The first low band receive amplifier 931 may connect to a second receive buffer 917 of the RFIC 910 through the second receive matching circuit 962. The second low band receive amplifier 933 may connect to a third receive buffer 918 of the RFIC 910 through the third receive matching circuit 963. As described above, the communication circuit 200 according to various embodiments of the present disclosure may be an RF circuit configuration of a diversity end, and BPFs may be disposed in the communication circuit 200 according to a dedicated receive operation.

If an electronic device 100 of FIG. 1 operates such that the band 8 and the band 20 operate as CA, all of the first switch 991, the second switch 992, the first low band receive amplifier 931, and the second low band receive amplifier 933 may operate to process a receive operation. According to various embodiments of the present disclosure, the low band front-end switching circuit 980b may simultaneously connect the BPFs 970b, which support the band 8 and the band 20, with the antenna 950 or the diplexer 955 to perform a CA operation.

According to various embodiments of the present disclosure, the communication circuit may include an antenna configured to communicate at least a part of a multi-band signal, at least one receive antenna configured to connect to the antenna and to low-noise amplify the multi-band signal, and a transceiver configured to include a mixer configured to mix the multi-band signal low-noise amplified by the at least one receive amplifier.

According to various embodiments of the present disclosure, the transceiver may include a buffer connected with an output end of the at least one receive amplifier.

According to various embodiments of the present disclosure, the communication circuit may further include a matching circuit disposed between the transceiver and the at least one receive amplifier.

According to various embodiments of the present disclosure, the communication circuit may further include a transmit amplifier configured to amplify a signal output from the transceiver, a transmit band switching circuit configured to classify and transmit an output signal of the transmit amplifier for each band, a front-end switching circuit configured to connect to the antenna, a duplexer or quadplexer configured to be disposed between the transmit band switching circuit and the front-end switching circuit, and a back-end switching circuit configured to connect with the duplexer or quadplexer. The at least one receive amplifier may be disposed at an output end of the back-end switching circuit.

According to various embodiments of the present disclosure, the communication circuit may further include a printed circuit board (PCB) or an epoxy structure in which an RF module, which includes at least one of the transmit amplifier, the transmit band switching circuit, the front-end switching circuit, the duplexer or quadplexer, the back-end switching circuit, and the at least one receive amplifier, is integrated.

According to various embodiments of the present disclosure, the RF module may include a plurality of RF modules. Each of the plurality of RF modules may be configured to support constant frequency bands (e.g., a high band, a middle band, a low band, and the like) including at least one frequency band (e.g., the bands 2, 3, 4, and 5, and the like).

According to various embodiments of the present disclosure, the communication circuit may further include a diplexer configured to connect to the antenna and to divide signals of the plurality of RF modules.

According to various embodiments of the present disclosure, the RF module may include a plurality of back-end switching circuits and a plurality of receive amplifiers respectively connected with the plurality of back-end switching circuits, according to carrier aggregation (CA) support.

According to various embodiments of the present disclosure, the communication circuit may further include at least one bypass circuit connected in parallel to the at least one receive amplifier. If a wireless environment is under a strong electric field of specific strength or more, the at least one bypass circuit may be turned on. If the wireless environment is under a weak electric field of less than the specific strength, the at least one bypass circuit may be turned off.

According to various embodiments of the present disclosure, the communication circuit may further include a plurality of matching circuits respectively connected to output ends of the plurality of receive amplifiers.

According to various embodiments of the present disclosure, the communication circuit may further include a dedicated receive RF module configured to include the at least one receive amplifier and to be disposed between the transceiver and the antenna. The dedicated receive RF module may include a front-end switching circuit configured to connect with the antenna, a BPF configured to connect to the front-end switching circuit, and at least one back-end switching circuit configured to connect to the BPF. The at least one receive amplifier connects to an output end of the at least one back-end switching circuit.

According to various embodiments of the present disclosure, the at least one back-end switching circuit may include a plurality of back-end switching circuits to selectively connect a plurality of frequency bands. The at least one receive amplifier may include a plurality of receive amplifiers to respectively connect to output ends of the plurality of back-end switching circuits.

According to various embodiments of the present disclosure, the communication circuit may further include a plurality of dedicated receive RF modules configured to respectively include the at least one receive amplifier, to be disposed between the transceiver and the antenna, and to respectively cover a plurality of frequency bands.

According to various embodiments of the present disclosure, the communication circuit may further include a diplexer configured to be disposed between the antenna and the plurality of dedicated receive RF modules.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device for performing certain operations.

According to various embodiments of the present disclosure, at least a part of a device (e.g., modules or the functions) or a method (e.g., operations) may be implemented with, for example, instructions stored in computer-readable storage media which have a program module.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

According to various embodiments of the present disclosure, the electronic device may be implemented to be smaller in size by reducing a size of the transceiver or the number of components of the transceiver.

Also, according to various embodiments of the present disclosure, the electronic device may save material costs and improve a process by more simplifying the disposal and wires of the receive amplifier, the matching circuit, and the like.

Also, according to various embodiments of the present disclosure, the electronic device may provide more good communication receiving performance according to the improved receive amplifier.

Although the present disclosure has been described with embodiments, various changes and modifications may be suggested to one skilled in the art. It is intended that the present disclosure encompass such changes and modifications as fall within the scope of the appended claims.

What is claimed is:

1. A communication circuit comprising:
   an antenna; and
   a radio frequency (RF) module comprising:
      a transmit amplifier configured to amplify a signal output from a transceiver;
      a front-end switching circuit configured to connect to the antenna;
      a duplexer or a quadplexer configured to be disposed between the front-end switching circuit and the transmit amplifier;
      at least one back-end switching circuit coupled to the duplexer or the quadplexer; and
      at least one receive amplifier that is disposed between the at least one back-end switching circuit and the transceiver, wherein the at least one receive amplifier is configured to low-noise amplify at least a part of a multi-band signal, and wherein the transceiver comprises a mixer configured to mix the multi-band signal low-noise amplified by the at least one receive amplifier.

2. The communication circuit of claim 1, wherein the transceiver further comprises:
a buffer configured to connect with an output end of the at least one receive amplifier.

3. The communication circuit of claim 1, further comprising:
a matching circuit configured to be disposed between the transceiver and the at least one receive amplifier.

4. The communication circuit of claim 1, wherein the RF module further comprises:
a transmit band switching circuit configured to classify and transmit an output signal of the transmit amplifier for each band, and
at least one of the front-end switching circuit, the duplexer or quadplexer, the back-end switching circuit, or the at least one receive amplifier, are integrated.

5. The communication circuit of claim 4, wherein the RF module comprises:
a plurality of RF modules configured to support a plurality of frequency bands, respectively.

6. The communication circuit of claim 5, further comprising:
a diplexer configured to connect to the antenna and to divide signals of the plurality of RF modules.

7. The communication circuit of claim 5, wherein the RF modules comprise:
a dedicated receive RF module comprising the at least one receive amplifier and configured to be disposed between the transceiver and the antenna,
wherein the dedicated receive RF module comprises:
a front-end switching circuit configured to connect with the antenna,
a band pass filter (BPF) configured to connect to the front-end switching circuit, and
at least one back-end switching circuit configured to connect to the BPF, and
wherein the at least one receive amplifier is configured to connect to an output end of the at least one back-end switching circuit connected to the BPF.

8. The communication circuit of claim 7, wherein the at least one back-end switching circuit connected to the BPF comprises:
a plurality of back-end switching circuits configured to selectively connect to a plurality of frequency bands, and
wherein the at least one receive amplifier comprises:
a plurality of receive amplifiers configured to respectively connect to output ends of the plurality of back-end switching circuits.

9. The communication circuit of claim 5, wherein the RF modules comprise:
a plurality of dedicated receive RF modules configured to be disposed between the transceiver and the antenna, and to respectively cover a plurality of frequency bands, wherein each of the dedicated receive RF modules respectively includes a receive amplifier of the at least one receive amplifier.

10. The communication circuit of claim 9, further comprising:
a diplexer configured to be disposed between the antenna and the plurality of dedicated receive RF modules.

11. The communication circuit of claim 1, wherein the at least one receive amplifier comprises a plurality of receive amplifiers, and
the communication circuit further comprises a plurality of matching circuits configured to respectively connect to output ends of the plurality of receive amplifiers.

12. The communication circuit of claim 1, further comprising:
at least one bypass circuit configured to connect in parallel to the at least one receive amplifier,
wherein if a wireless environment is under a strong electric field of specific strength or more, the at least one bypass circuit is turned on, and
wherein if the wireless environment is under a weak electric field of less than the specific strength, the at least one bypass circuit is turned off.

13. The communication circuit of claim 1, wherein the at least one back-end switching circuit comprises a plurality of back-end switching circuits, and
wherein the at least one receive amplifier comprises a plurality of receive amplifiers respectively connected to the plurality of back-end switching circuits according to a carrier aggregation (CA) operation.

14. An electronic device comprising: a communication circuit comprising:
an antenna; and
a radio frequency (RF) module comprising:
a transmit amplifier configured to amplify a signal output from a transceiver;
a front-end switching circuit configured to connect to the antenna;
a duplexer or quadplexer configured to be disposed between a front-end switching circuit and the transmit amplifier;
at least one back-end switching circuit coupled to the duplexer or the guadplexer; and
at least one receive amplifier that is disposed between the at least one back -end switching circuit and the receiver,
wherein the at least one receive amplifier is configured to low-noise amplify at least a part of a multi-band signal, and
wherein the transceiver comprises a mixer configured to mix the multi-band signal low-noise amplified by the at least one receive amplifier.

15. The electronic device of claim 14, wherein:
the radio frequency (RF) module further comprises:
a transmit band switching circuit configured to classify and transmit an output signal of the transmit amplifier for each band.

16. The electronic device of claim 15, wherein the RF module further comprises:
a plurality of RF modules configured to support a plurality of frequency bands, respectively.

17. The electronic device of claim 14, further comprising:
at least one bypass circuit configured to connect in parallel to the at least one receive amplifier.

18. The electronic device of claim 17, wherein a modem is further configured to:
turn on the at least one bypass circuit if a wireless environment is under a strong electric field of specific strength or more; or
turn off the at least one bypass circuit if the wireless environment is under a weak electric field of less than the specific strength.

19. The electronic device of claim 14, wherein the at least one back-end switching circuit comprises a plurality of back-end switching circuits, and
wherein the at least one receive amplifier comprises a plurality of receive amplifiers respectively connected to the plurality of back-end switching circuits according to a carrier aggregation (CA) operation.

* * * * *